UNITED STATES PATENT OFFICE.

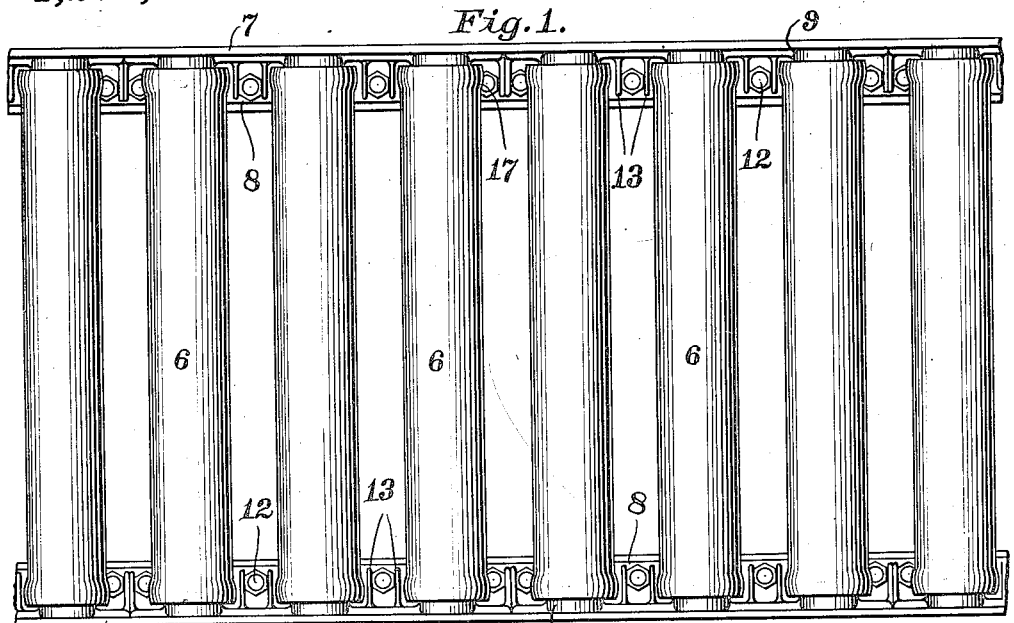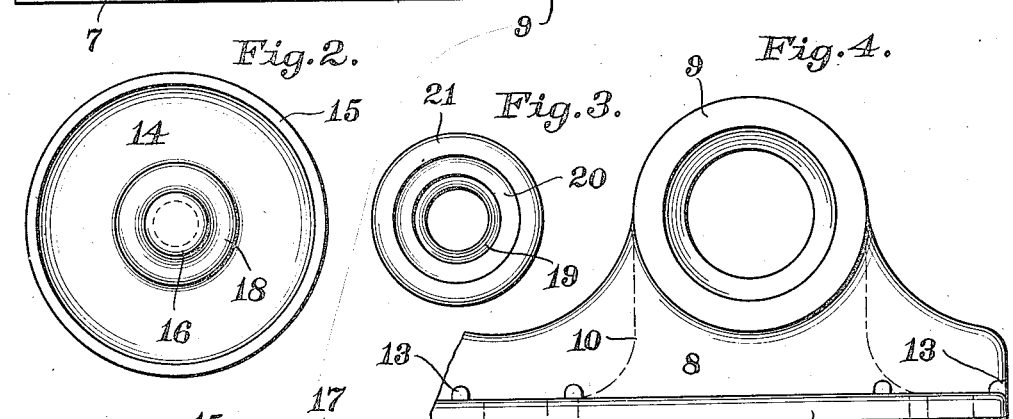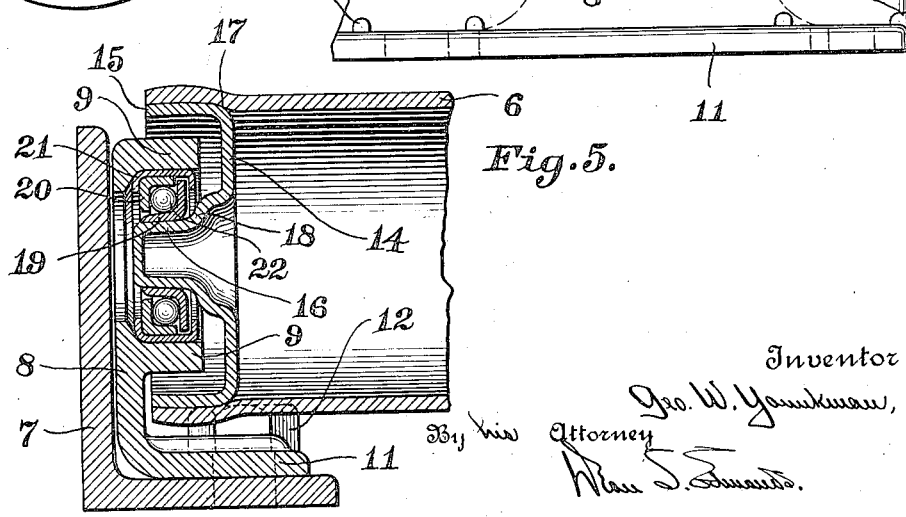

GEORGE W. YOUNKMAN, OF BROOKLYN, NEW YORK.

BEARING FOR CONVEYERS.

1,243,375.  Specification of Letters Patent.  Patented Oct. 16, 1917.

Application filed January 10, 1916. Serial No. 71,182.

*To all whom it may concern:*

Be it known that I, GEORGE W. YOUNKMAN, a citizen of the United States, residing in the borough of Brooklyn, county of Kings, and State of New York, have invented certain new and useful Improvements in Bearings for Conveyers; and I do hereby declare the following to be a full, clear, and exact description of the invention, such as will enable others skilled in the art to which it appertains to make and use the same.

This invention relates to conveyers of the roller type and more particularly to the construction of the bearings employed at the ends of the conveyer rollers consisting of sections of tubing. The invention is directed to the provision of an improved form of bearing construction for rollers of this type which does not require perforation of the side-frames and trunnions on the rollers extending through such perforations, which permits the rollers to run freely and smoothly and without appreciable wear over an extended period of use, with which the ends of the rollers can be readily closed to prevent the entrance and accumulation of material within the rollers, which is of marked simplicity and possesses great strength, and which may be manufactured at relatively low cost.

In accordance with the invention, rollers are employed consisting of sections of tubing and supporting members are set into the ends of these rollers for the support of ball bearings. These supporting members are preferably sheet metal pieces which are pressed into form so as to provide a peripheral flange adapted to engage the interior wall of the roller and also to provide an integral central projection to which the ball bearing may be readily affixed. The ball bearing is preferably of annular form and consists of inner and outer annular members having balls between them. Such a ball bearing can be readily mounted on the supporting member above referred to with the projection on the supporting member extending through the bearing and these two parts may be made to wedge one on the other. Preferably these parts are so positioned relatively that the ball bearings lie within the ends of the roller. For the support of the rollers so constructed, side-frames are provided and on these are mounted a plurality of supports including cylindrical receptacles adapted to receive the ball bearings on the rollers. These receptacles are preferably formed by circular walls secured to the side-frames and each of these walls enters the space surrounding the corresponding ball bearing and within the end of the roller.

One of the advantageous characteristics of such a construction is that it does not require perforation of the side-frames or involve the use of trunnions on the rollers extending through such perforations. These features of conveyer structures as heretofore made have been very objectionable, particularly as the ends of the trunnions extending beyond the perforations in the side-frames are so apt to catch on the clothing of the operators.

This construction possesses a further advantage in that it permits of closing the ends of the rollers quite readily. The supports for the ball bearings in the ends of the rollers may be made from flat sheet metal plates of circular form by subjecting such plates to dies which form the peripheral flange adapted to coact with the interior of the roller and the central projection which supports the ball bearing. If the dies be so formed as not to perforate the piece, the securing of the supports in the ends of the section of tubing for the roller effectually closes the ends of the roller. This is of considerable importance in some cases, as for instance, in conveyers for use in dairies, where otherwise milk would work into the interior of the rollers where cleaning operations are difficult or impossible.

Further advantageous features of this construction are that it is very simple, that it possesses a high degree of strength, that it conduces to easy and smooth running of the rollers, that there is little side play of the rollers, that it permits of manufacture at low cost, that it is very compact, and that the roller bearings can be readily renewed when such renewal becomes necessary.

These and other features of the invention will be better understood by reference to the following description taken in connection with the accompanying drawings which show the preferred embodiment of the invention. In these drawings, Figure 1 is a top view of a section of the conveyer; Fig. 2 is an elevation of the support for the ball bearing which is inserted in the ends of the rollers; Fig. 3 is an elevation of the ball bearing; Fig. 4 is a view of a portion of one of the supports which receive the ball bearings; and Fig. 5 is a vertical section through one end of one of the rollers and the devices coacting therewith.

Referring to these drawings, a section of a conveyer is shown in Fig. 1 consisting of two side-frames extending parallel to each other, and a multiplicity of rollers extending across the space between the two side-frames in parallel relation and spaced apart a distance dependent on the character of the materials to be handled by the conveyer. Each of the rollers 6 consists of a section of tubing. The side-frames 7 are formed from long lengths of angle iron as indicated in Fig. 5. These side-frames 7 have members 8 secured thereon, each of which is shaped to form one or more receptacles which receive the bearings secured to the ends of the rollers. These receptacles are of cylindrical shape and are formed by circular walls 9 integral with the members 8. Preferably, each casting 8 has three of the cylindrical receptacles formed thereon, the centers of the receptacles being four inches apart. Thus, when the castings 8 are secured on the side-frames 7 end to end and rollers mounted in all of the positions, the rollers will be four inches apart. If desired, these same castings may be spaced apart a distance of four inches and rollers placed only in the two end receptacles, in which case the rollers will be spaced apart eight inches. To provide for other spacing of the rollers, castings of a length to include only one of the circular walls 9, as indicated by the dotted lines 10 in Fig. 4, may be provided, these castings being spaced apart as desired, and each pair of castings supporting only one roller. The castings 8 have flanges 11 at their lower ends adapted to rest upon the horizontal flanges of the side-frames 7 and to be bolted thereto. For this purpose, bolts 12 and nuts thereon may be employed and the flanges 11 of the castings 8 are preferably provided with transverse walls 13 which serve to prevent turning of the nuts while tightening up the bolts.

For mounting the ball bearings upon the ends of the rollers 6, supporting plates 14 are provided. Each of these plates is formed from a circular piece of sheet metal which is shaped by suitable dies so as to provide a peripheral flange 15 and a central projection 16. Preparatory to securing the plate 14 in the end of a roller, the metal of the roller is expanded slightly immediately adjacent to the end of the roller so as to form a shoulder 17 against which the plate 14 rests when it is inserted in the end of the roller. The extreme edge of the roller is then subjected to pressure to force it inwardly into hard engagement with the flange 15 of the plate 14. In this way the plate 14 is interlocked with the end of the roller in such a way as to rigidly secure the plate in the end of the roller without requiring the use of bolts, rivets, or similar fastening devices. The projection 16 may be so formed as to present a surface which is slightly tapering and a shoulder 18 at the end of this tapered surface.

The projection 16 so formed is adapted to receive a ball bearing of annular form, such as that shown in Figs. 3 and 5. This bearing consists of inner and outer annular members 19 and 20, a casing 21 surrounding these parts, and balls 22 between the members 19 and 20. The casing 21 is of such size as to grip the outer annular member 20 and provide a space between one of the flanges of the casing and the adjacent edge of the member 20, in which one edge of the inner member 19 is retained without impeding the rotation of the member 19 relatively to the member 20 and casing 21. The opening through the inner annular member 19 is provided with a tapered surface corresponding to the taper of the projection 16. In order to secure the ball bearing in position, it is only necessary to insert it over the projection 16 and subject it to a blow, whereupon the two tapered surfaces engage so as to hold the bearing upon the plate 14 with the requisite rigidity. With the parts thus assembled, the plate 14 and the bearing thereon lie within the end of the roller 6 and an annular space is provided around the projection 16 and within the end of the roller adapted to receive the circular wall 9 on the casting 8.

The parts thus constructed are assembled in the manner indicated in Figs. 1 and 5. It will be noted by reference to these figures that the construction does not require the perforation of the side-frames 7 and the provision of trunnions on the rollers extending through such perforations, in which case there would be rotating parts projecting beyond the outer surfaces of the side-frames. Furthermore, the construction is such that the ends of the rollers 6 are closed by the plates 14 so that it is impossible for material to work into the spaces within the rollers, from which it could not be readily cleaned. If it be desirable to provide openings to the interior of the rollers for any purpose, the ends of the projections 16 may be cut off. The construction is very simple and permits of manufacture at very low cost. Also, its wearing qualities are very good, particularly in that there is a complete absence of rivets and bolts for holding the parts together, such as might work loose during an extended period of use.

The parts so constructed may be readily assembled and when assembled are very compactly arranged. The ball bearings are of substantially cylindrical form and fit snugly within the substantially cylindrical receptacles on the members 8 formed by the circular walls 9. It is unnecessary to secure the casings of the ball bearings to the members 8 but merely to insert the ball bearings within the receptacles and allow their casings to rest upon the surrounding walls 9 and the latter lie within the annular spaces between the bearings and the ends of the rollers.

What I claim is:

The combination of a roller consisting of a section of tubing, a circular sheet metal member located in each end of the roller having a peripheral flange which lies in engagement with the interior wall of the roller and an integral projection concentric with the roller forming an annular space between the flange and projection, annular ball bearings consisting of inner and outer annular members and balls between them mounted on the ends of the roller with said projections extending within them, an imperforate side frame, a member mounted thereon and a cylindrical receptacle formed on the member receiving the annular ball bearing to support the roller and having its edge entering said annular space so as to be inclosed within the end of the roller; substantially as described.

In testimony whereof I affix my signature.

GEORGE W. YOUNKMAN.